(12) United States Patent
Simmons et al.

(10) Patent No.: US 7,574,699 B1
(45) Date of Patent: Aug. 11, 2009

(54) COMPACT TYPE FORMAT DATA SYSTEM AND METHOD

(75) Inventors: Matthew T. Simmons, San Francisco, CA (US); Michael W. Shapiro, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1403 days.

(21) Appl. No.: 10/392,796

(22) Filed: Mar. 19, 2003

(51) Int. Cl.
*G06F 9/45* (2006.01)
(52) U.S. Cl. ...................................... 717/136
(58) Field of Classification Search ............... 717/136
See application file for complete search history.

(56) References Cited

U.S. PATENT DOCUMENTS

| | | | | |
|---|---|---|---|---|
| 6,490,374 B2* | 12/2002 | Puetter et al. | ............... | 382/265 |
| 6,658,571 B1* | 12/2003 | O'Brien et al. | ............... | 726/26 |
| 6,732,265 B2* | 5/2004 | Esfahani et al. | ................. | 713/2 |
| 2002/0044600 A1* | 4/2002 | Scheirer et al. | ............. | 375/240 |
| 2006/0168589 A1* | 7/2006 | Moore | ......................... | 719/515 |
| 2006/0190939 A1* | 8/2006 | Chen et al. | ................... | 717/168 |

\* cited by examiner

*Primary Examiner*—John Chavis
(74) *Attorney, Agent, or Firm*—Martine Penilla & Gencarella, LLP

(57) ABSTRACT

A data type encoding and compression system for a computer system is described. The encoding and compression system encodes and compresses programming language data structure and data type information for use in a kernel, system program or user application. The encoded and compressed data structure and data type information is generated using an encoding called compact type format (CTF). The data encoding and compression system includes merging logic that identifies common data structures within object files used to generate a given kernel module, system program or user application. Data structures common to a parent and a given child module are removed from the child module, during the merging process, and replaced by links from the child to the parent, thereby reducing the total size of the CTF data.

40 Claims, 9 Drawing Sheets

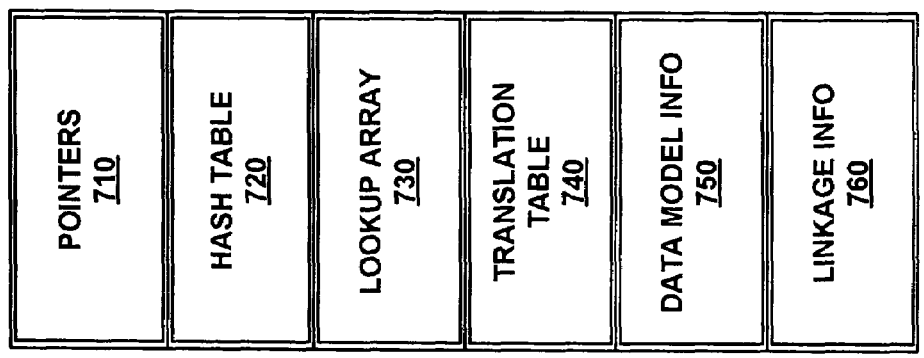

US 7,574,699 B1

COMPACT TYPE FORMAT DATA SYSTEM AND METHOD

FIELD OF THE INVENTION

The present claimed invention relates generally to the field of computer operating systems. More particularly, embodiments of the present claimed invention relate to a system for facilitating the debugging, analysis, and observability of operating systems and the programs that run under them.

BACKGROUND ART

A computer system can be generally divided into four components: the hardware, the operating system, the application programs and the users. The hardware (e.g., central processing unit (CPU), memory and input/output (I/O) devices) provides the basic computing resources. The application programs (e.g., database systems, games, business programs (database systems, etc.) define the ways in which these resources are used to solve computing problems. The operating system controls and coordinates the use of the hardware resources among the various application programs for the various users. In doing so, one goal of the operating system is to make the computer system convenient to use. A secondary goal is to use the hardware in an efficient manner.

The Unix operating system is one example of an operating system that is currently used by many enterprise computer systems. Unix was designed to be a time-sharing system, with a hierarchical file system, which supported multiple processes. A process is the execution of a program and consists of a pattern of bytes that the CPU interprets as machine instructions (text), data and stack. A stack defines a set of hardware registers or a reserved amount of main memory that is used for arithmetic calculations.

The Unix operating system consists of two separable parts: the "kernel" and the "system programs." Systems programs consist of system libraries, compilers, interpreters, shells and other such programs that provide useful functions to the user. The kernel is the central controlling program that provides basic system facilities. The Unix kernel creates and manages processes, provides functions to access file-systems, and supplies communications facilities.

The Unix kernel is the only part of Unix that a user cannot replace. The kernel also provides the file system, CPU scheduling, memory management and other operating-system functions by responding to "system-calls." Conceptually, the kernel is situated between the hardware and the users. System calls are used by the programmer to communicate with the kernel to extract computer resource information. The robustness of the Unix kernel allows system hardware and software to be dynamically configured to the operating system while applications programs are actively functional without having to shut-down the underlying computer system.

The kernel and system programs consist of a machine-code representation of programs developed in a higher-level language, such as C, C++, or assembly language. These programs make use of data structures—a structured grouping of program data, the order and composition of which are essential to understanding the data structures. This ordering and composition information is used during a compilation process—the translation of programs from high-level languages to machine code. During the compilation of optimized code, such as that used for the Unix kernel and system programs, the ability to easily extract this information from the resulting program objects or modules objects is lost.

In order to analyze the data structures used by the kernel and system programs, separate and special-purpose extraction and analysis programs must be written. These programs contain the knowledge necessary to reconstruct the data structures used by the kernel. As these programs have specific knowledge of the data structures involved, they must be updated whenever the data structures change, and must be delivered separately from the kernel modules and system libraries.

FIG. 1 is a block diagram illustration of an exemplary prior art computer system 100. The computer system 100 is connected to an external storage device 180 and to an external drive device 120 through which computer programs can be loaded into computer system 100. The external storage device 180 and external drive 120 are connected to the computer system 100 through respective bus lines. The computer system 100 further includes main memory 130 and processor 110. The drive 120 can be a computer program product reader such a floppy disk drive, an optical scanner, a CD-ROM device, etc.

FIG. 1 additionally shows memory 130 including a kernel level memory 140. Memory 130 can be virtual memory which is mapped onto physical memory including RAM or a hard drive, for example. A programmer designs data structures used by the kernel 140. When the kernel 140 is compiled, the data structures are irreversibly encoded in the programs stored in the kernel level memory 140. User applications 160A and 160B are coupled to the computer system 100 to utilize the kernel memory 140 and other system resources in the computer system 100. Irreversibly-encoded data structures are also present in user applications 160A and 160B. As the composition of these data structures cannot be automatically extracted from the kernel level memory 140 and/or user applications 160A and 160B, specialized programs must be written to perform this task manually.

These manual extraction operations, which are essential for debugging and program analysis, are closely tied to the composition and ordering of the data structures, and thus must be manually maintained separately from the kernel and user applications they reference. These extractions operations must be updated whenever the data structures they extract change.

Prior art attempts to encode data structure information in kernel modules and user applications use either stabs or DWARF encodings. These encodings are wasteful, as they include massive duplication between program source files. To include these encodings in the kernel level memory 140 would result in performance degradation to the underlying computer system.

SUMMARY OF INVENTION

Accordingly, to allow data structure and data-type information to be included in the kernel level memory and in user applications without degrading the performance of the computer system, a need exists to develop a new compact encoding system. This new encoding system will remove the duplication present with the prior art, and will facilitate programmatic analysis and debugging of the kernel. A further need exists to use this encoding mechanism in system programs and user applications.

What is described herein is a computer system that provides a technique for encoding and compressing programming language data structure information for use in a kernel, system programs, and user applications. Also described is a technique for including this encoded data structure information in the kernel, system programs and user applications, as well as techniques for extracting this information for use in debugging and program analysis. Embodiments of the present invention allow programmers to automatically generate this encoding during the compilation process for these programs. Embodiments of the present invention allow programmers to extract and utilize the data structure information included within the encoding for debugging and analysis purposes.

The invention provides users with an encoding, known as compact type format (CTF), which can be used to compactly represent information needed by a given debugger or analysis program to interpret ANSI-C program types used by a given program. Traditionally, this kind of information is generated by a compiler when invoked with a special debugging flag (e.g., "g"), and is generated in either the stabs or DWARF encodings. The data structure and data type encoding system (DSDTE) described herein results in a compact encoding (CTF) that is more applicable to optimized programs, such as the Unix kernel, where program size is a concern. CTF-encoded type data is much more compact than that created using either the stabs or DWARF encodings of the prior art and has no duplication. The DSDTE system comprises an encoding format (CTF), a mechanism for generating the CTF data and an access mechanism.

Embodiments of the present invention further include a C header file that describes the CTF encoding in such a way that allows it to be included in other programs.

Embodiments of the CTF generation mechanism include data structure description merge logic that identifies common data structures within the object files used to generate a given kernel module, system program, or user application. This logic can operate within a single kernel module, in which case duplicate data structures are removed from the individual object files resulting in a kernel module with at most one copy of each data structure. The merge logic may also operate on several modules, arranged as a single parent and multiple children. Data structures common to the parent and a given child are removed from the child, and are replaced by links from the child to the parent. The removal of duplicate type information thus reduces the size of child(ren) modules. In one embodiment of the present invention, the DSDTE system uses stabs encoding of the data structure information for programs written in the C programming language. This stabs encoding is then transformed into CTF data, free of duplication.

Embodiments of the present invention also include a mechanism by which types in parent modules can be evolved without breaking existing links from children modules. New and changed types are layered on top of existing CTF data in the parent module, thus preventing links from children while still exposing the new and changed types to consumers.

Embodiments of the present invention further include CTF data library that may be used by debuggers and other programs that wish to access the data structure information encoded within kernel modules, system programs, or user applications. The library includes a set of application program interfaces (APIs) that allow the application programs access and manipulate the CTF encoding, thus allowing the continued operation of application programs even in the face of changes to the CTF encoding.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7 is a block diagram illustration of one embodiment of an internal architecture of the library whose APIs are used to access CTF data.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to automatically generate encoded data structure and data type information. In accordance with an aspect of the invention, a library exposing application program interfaces (APIs) provides access by a debugger or other program to the encoded data structure information included with a kernel module, system program, or user application. These accessor programs may use this information to diagnose problems with the operational system, to facilitate post-mortem analysis of systems that have crashed, or to perform monitoring of running systems.

Figure 1:
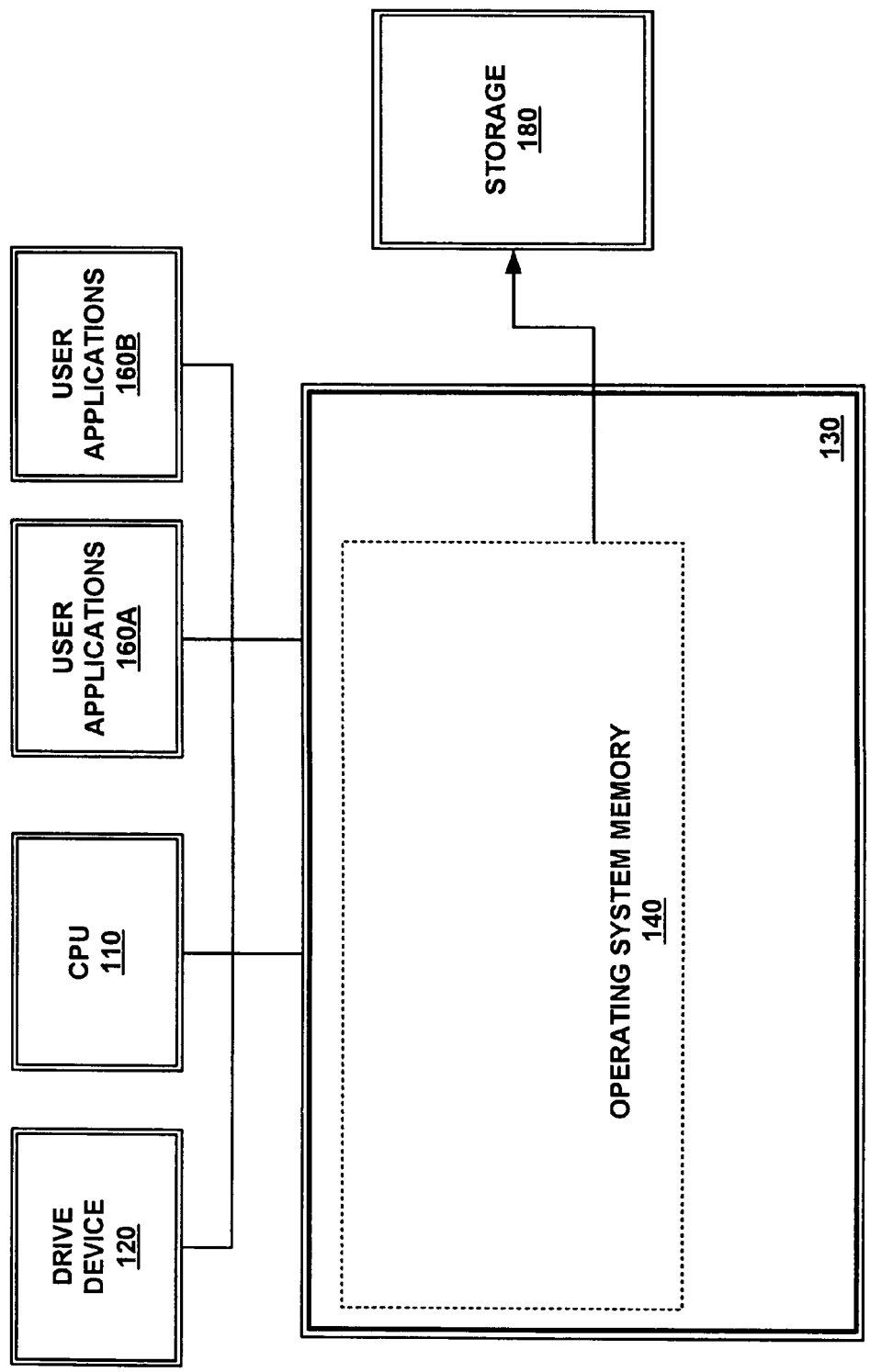
FIG. 1 is a block diagram of a prior art computer system.
Figure 2:
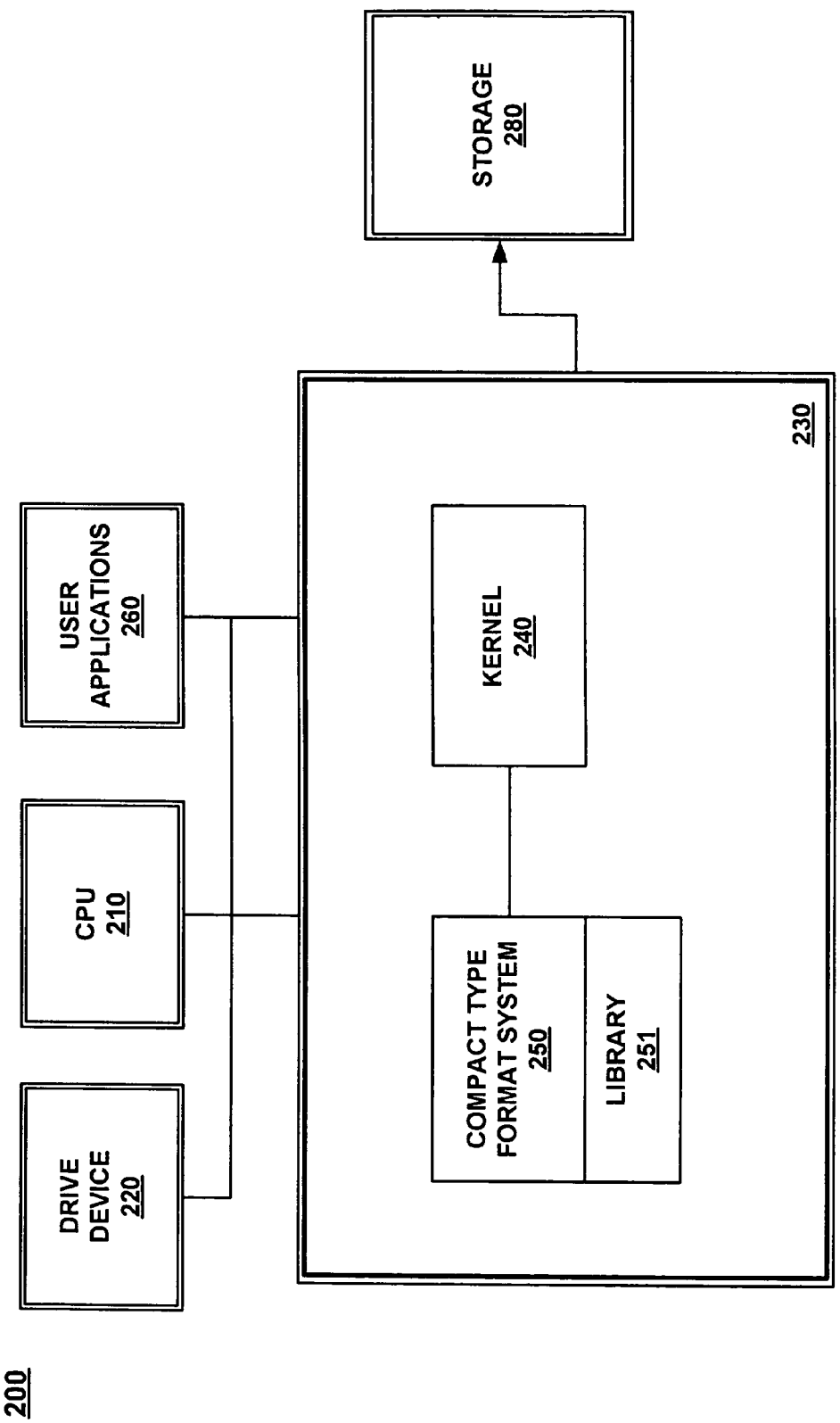
FIG. 2 is a block diagram of a computer system in accordance with an embodiment of the present invention.

FIG. 2 is a block diagram illustration of one embodiment of a computer system 200 of the present invention. The computer system 200 according to the present invention is connected to an external storage device 280 and to an external drive device 220 through which computer programs according to the present invention can be loaded into computer system 200. External storage device 280 and external drive 220 are connected to the computer system 200 through respective bus lines. Computer system 200 further includes main memory 230 and processor 210. Drive 220 can be a computer program product reader such a floppy disk drive, an optical scanner, a CD-ROM device, etc.

FIG. 2 shows memory 230 including a kernel level memory 240. Memory 230 can be virtual memory which is mapped onto physical memory including RAM or a hard drive, for example, without limitation. When a programmer creates a source code for a program, the programmer creates data structures. These data structures are used during a compilation process to create programs. The present invention aside, the composition and format of these data structure cannot be automatically retrieved from compiled programs. When the program runs, instances of these data structures are created in either memory 230 or the kernel level memory 240. As the data structure composition information cannot currently be extracted from the program, manual extraction programs must be written and maintained.

According an embodiment of the present invention, the memory 230 (in the case of system programs and user applications) and/or the kernel memory level (in the case of kernel modules) include an encoding of the composition and format of the data structures used in the kernel modules, system programs and/or user applications. This encoding, referred to as the compact type format (CTF) is generated by a further embodiment of the present invention—the DSDTE 250. In one embodiment of the present invention, the DSDTE 250 automatically generates CTF data from program source and object code. In one embodiment of the present invention, the CTF data is generated from source code written using the C programming language. In one embodiment of the present invention, the encoding is generated from source code written using other programming languages.

Duplicate type information is removed from the encoded data and compression is applied allowing the CTF data to require very little space in the memory 230 or kernel level memory 240. In one embodiment of the present invention, CTF data associated with the operating system kernel is copied into kernel level memory 240 and is always present. This ensures that the CTF data is copied out to a kernel memory dump, known as a crash dump, created when the system 200 crashes.

In one embodiment of the present invention, the CTF data, whether residing in a running kernel 240, crash dump, system program, or user application 260 may be accessed via application program interfaces (APIs) provided by library 251. Programs may use this library to read CTF data from any one of the above sources. The library 251 allows programs to retrieve programmatic descriptions of the data structures and data type information included within the accessed CTF data. For example, this allows programs to determine the argument and return types used by functions included within the object whose CTF data is being accessed. Information regarding the composition, size, and location of components of the data structures may also be accessed.

Figure 3:
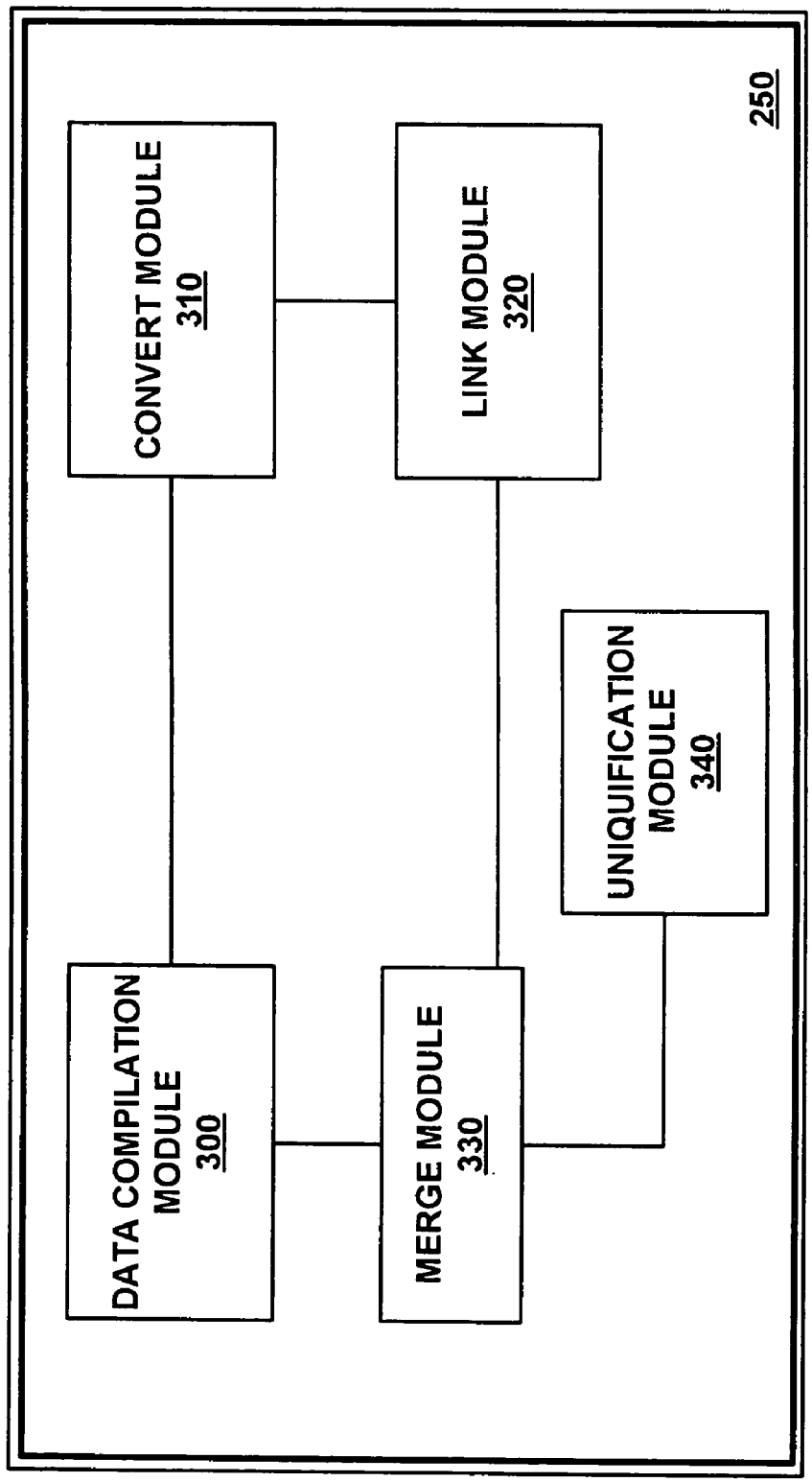
FIG. 3 is a block diagram of an embodiment of the data structure and data type encoding (DSDTE) system in accordance with one embodiment of the present invention.

FIG. 3 is a block diagram illustration of one embodiment of the data structure and data type compression system (DS-DTE) 250 of the present invention. The DSDTE 250 comprises compilation module 300, convert module 310, linking module 320, merge module 330, and uniquification module 340.

The compilation module 300 converts source files created by a programmer into object files. In the process, stabs-encoded data structure and data type information is generated. Stabs data generated by the compilation module 300 is converted into the CTF encoding by conversion module 310. The CTF-encoded data is stored within the object file. In one embodiment of the present invention, ELF-type object files are used, thus allowing the CTF data to be added via a new ELF section of the object file.

The source files are linked together by the linking module 320 to form the final module or program. With stabs-encoded type data, this results in the inclusion of duplicate type information in the resulting module or program file. The merge module 330 is used to combine the CTF data from the object files into CTF data for the module/program. The merge module 330 removes duplicate data structure and data type information, thereby creating duplicate-free CTF data that is then compressed and included with the linked module or program. Access to the CTF data generated by the convert module 310 and merge module 330 is provided by the library 251.

Figure 4:
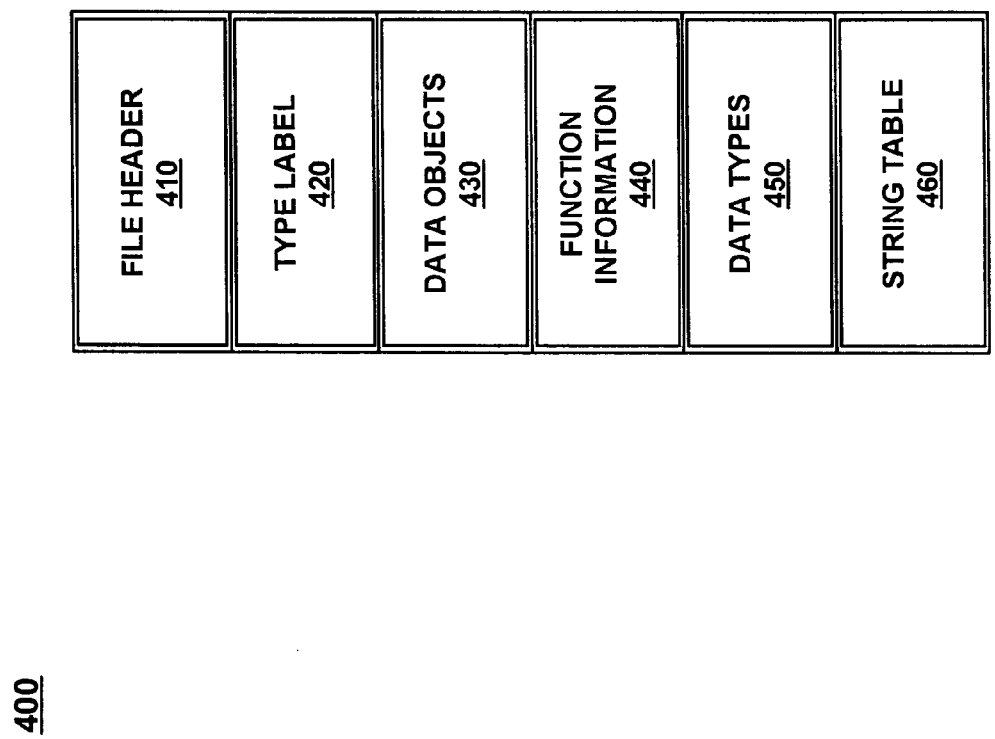
FIG. 4 is a block diagram of one embodiment of an internal architecture of a compact type format (CTF) encoding module of one embodiment of the present invention.

Reference is now made to FIG. 4 which is a block diagram illustration of one embodiment of a compact type format data layout 400 of the present invention. As depicted in FIG. 4, the data layout 400 comprises file header 410, type label 420, data objects 430, function information 440, data types 450 and string table 460.

The file header 410 contains information about the CTF data 400, as well as an identifying marker, which allows the CTF data 400 to identified as such. In one embodiment of the present invention, the information provided by the file header 410 may include an indication as to the presence or absence of data compression in the CTF data 400, the data format version and the location of the various sections (e.g., type labels, data objects, etc.). If compression has been used, all data beyond the header is compressed and a compression flag is set in the header 410. The offsets always refer to uncompressed data. As such, users of the CTF data have to uncompress the data before they can use it. If uniquification has been used, child modules will have the name of the parent module and the parent label recorded in their header 410. In one embodiment of the present invention, application programs are usually be protected from the details of compression and format version by the library 251.

The type label 420 provides labels that are used to identify sets of types in the "data type" section 450. The type label 420 comprises a name "n" and an index "i" that indicate that the label "n" refers to all types with indices from 1 to I, inclusive. When used in the context of uniquification, they allow child objects to indicate that they have only been uniquified against a specific subset of the types in the parent—the subset indicated by the label. In one embodiment of the present invention, the DSDTE system 250 performs an additive merge in which objects are only uniquified against the subset of type that can be guaranteed to be present. For example, assume that a given module A has been uniquified against another module B. Also assume that module B has been released in version 1, 2, and 3. Each version has added another set of types resulting in labels B1, B2, and B3, each of which refers to an accumulating set of types. That is, if version 1 was released with types 1-20, version 2 with another 10 types, and version 3 with yet another 10 types, labels B1, B2 and B3 would refer to types 1-20, 1-30 and 1-40, respectively. If module A only has a dependency against version 2 of module B, then any unification of A against B will be done against the types described by B2 label.

The data object section 430 is used to store descriptions of global and static data objects which may also be referred to as global and static variables. The data object 430 is n array of 16-bit type IDs, each of which indicates the type of a given data object. In one embodiment of the present invention, the array is sorted such that it mimics the ordering found in the ELF symbol table of the kernel module, system program, or user application. By referring to the symbol table, the CTF data 400 does not have to store a copy of the name of the given data object.

The function information section 440 is used to store descriptions of functions defined in a given module. Functions have return types, as well as argument types. The function section 440 comprises an array of variable-sized function description that include a number of arguments, the identifications of the return type, and the identification of the argument type. In one embodiment of the present invention, each element in the function information section 440 is preferably 16 bits long. The number of arguments occupies the least significant 10 bits (bits 9-0) of the first element. Functions are arranged in the function information section 440 according to the order found in the symbol table as with data objects.

The data types section 450 is arranged as an array of type descriptions, each of which describes an individual type. The order of these descriptions is important, as it determines the type ID used to refer to each type. In the case of standalone CTF sections (e.g., those which have not been uniquified against other modules), elements are numbered starting with zero. In one embodiment of the present invention, types in uniquified modules number elements starting with, for example, 32768. This allows the parent module and the child module in the same type ID space without collisions. For recording in the CTF data 400, data types 440 are decomposed into individual elements.

The string table section 460 is a feature of ELF which is imported for use in the CTF encoding 400. A string table comprises of a number of concatenated strings with each one separated by a NULL character (ASCII value 00). Entities which reference the string table do so by storing the offset of a given string in the table. For example, a string table consisting of the strings "foo" and "bar" could have the following layout:

f o o NULL b a r NULL

Note that the spaces above are for clarity, and are not part of the layout. Programs wanting to refer to the string "bar" would store the index 4 (characters are indexed starting with zero). String table references in CTF data have the following format: string table ID; offset.

The string table ID 460 is used to allow references to use either the string table 460 in the CTF data 400 or the string table 460 included as part of the ELF object. In one embodiment of the present invention, string references with table ID zero refer to the CTF string table 460.

Figure 5A:
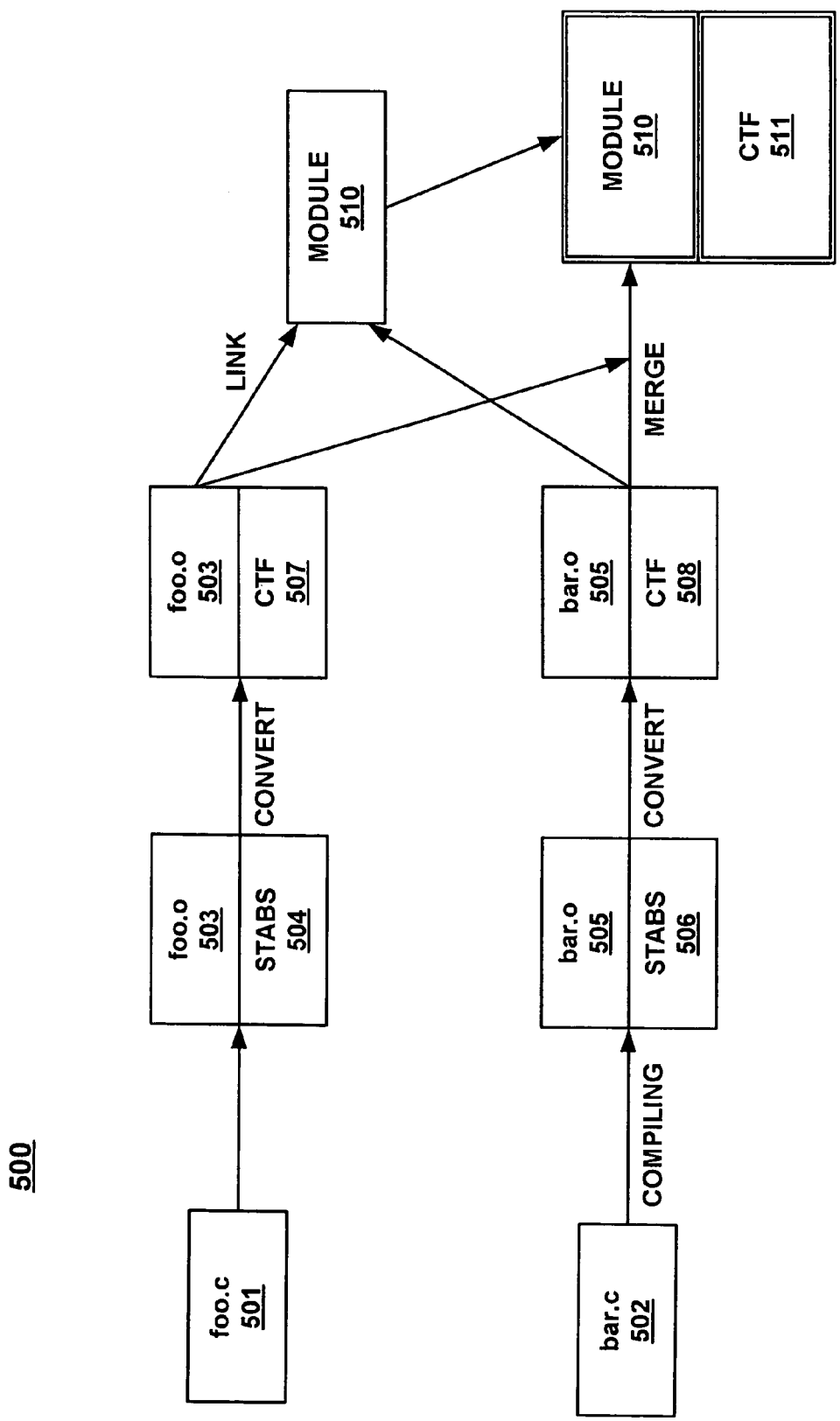
FIG. 5A is a block diagram of one embodiment of a system data flow of the DSDTE system of one embodiment of the present invention.

FIG. 5A is a block diagram of one illustration of one embodiment of the generation of the CTF data 400 of one embodiment of the present invention. As shown in FIG. 5A, two files 501 and 502 are presented to the DSDTE system 250 for processing. In one embodiment of the present invention, the files 501 and 502 are "C" programming language source files that are compiled into respective object files 503 and 505. The compiler generates stabs-encoded type data 504 and 506 that accompanies object files 503 and 505, respectively.

Still referring to FIG. 5A, the object files 503 and 505 with stabs sections 504 and 506 are converted by the conversion logic 310 to transform the stabs data into CTF type data 507 and 508 respectively. Object files 503 and 505 are linked by the linking logic 320 resulting in module 510. The merge logic 330, using a process described below, merges the CTF data 507 and 508. The merged CTF data 511 is compressed and is then included with module 510.

Merging

Figure 5B:
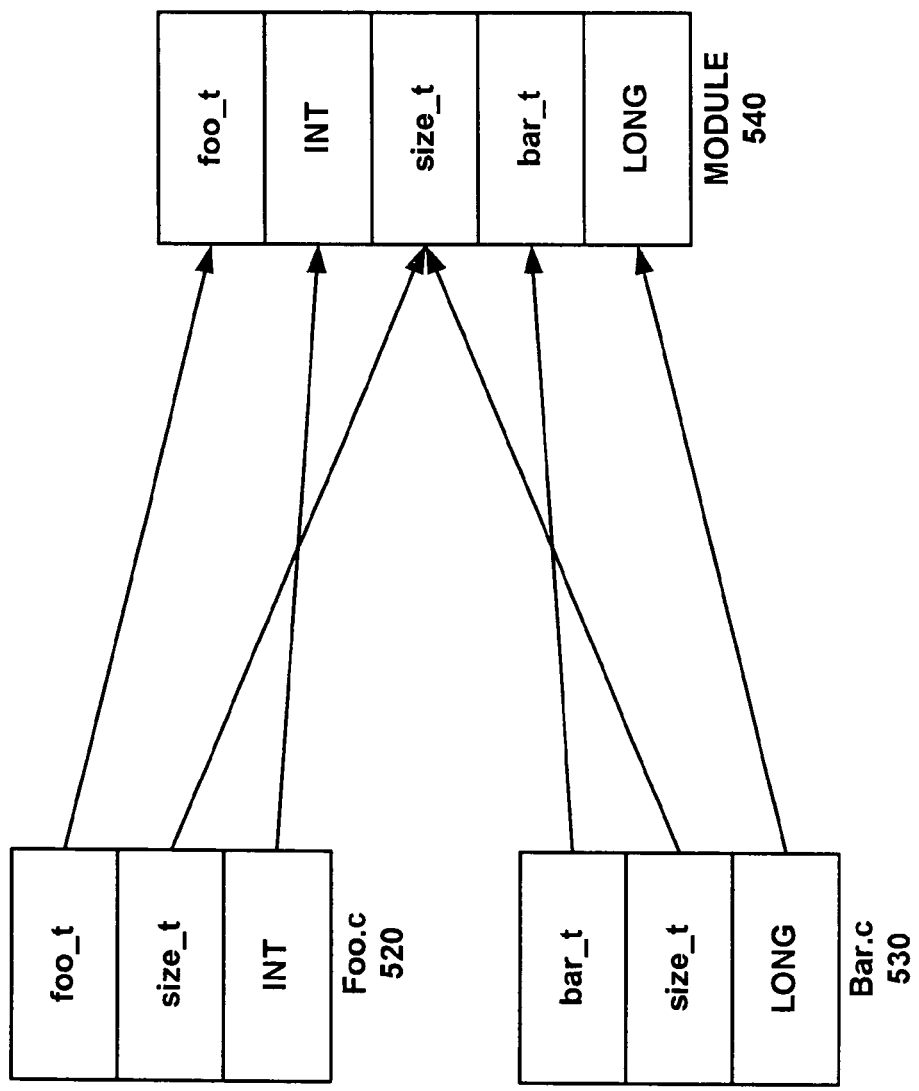
FIG. 5B is a block diagram of one embodiment of compact type format data merge logic of one embodiment of the present invention.

Merging is a central feature of the DSDTE system 250 of the present invention. Referring to FIG. 5A, the merging process is used to combine the CTF data generated from two or more source files 501 and 502 resulting in a merged CTF section 511 free of duplicate types. Removing duplicate instances of type nodes common to multiple files results in a smaller CTF section than would have resulted if duplicate information was not removed. FIG. 5B illustrates how two CTF sections 520 and 530 are merged, thus removing duplication in the resulting single CTF section. In the example illustrated in FIG. 5B, both sections 520 and 530 contain some type nodes (e.g., 522 and 532) that are common. If the merge logic 330 finds common entries, a map between the two (between their type IDs) is established.

The merge logic 330 continues to attempt to map entries from section 520 to section 530. If a map can be established, one copy of the common type is copied to the merged section 540. If a given type is unique, it is copied to the merged section 540. The merge logic 330 substantially reduces the size of the merge section 540. When the merge has completed, a default label is created that encompasses all types in the merged section 540.

Uniquification

Uniquification is used, in one embodiment of the present invention, when two or more entities, such as kernel modules, will be present on the same system. A further opportunity for the removal of duplication arises, as a set of common types will be present in all of the kernel modules. If this common set can be restricted to one of the modules, the total size required to store the CTF sections for the set of modules will be reduced. This process is accomplished by first selecting a parent module. This parent module is guaranteed to always be present on the resulting system. Child modules can thus depend on the presence of the parent. For each type common to both a given child and the parent, the type is removed from the child, and a link is established from the child to the parent. The mechanism used is similar to that used for merging, described above, but with a modification. Only those nodes unique to the child are copied to the uniquified CTF section. When the merge has completed, only child-unique types will have been copied to the uniquified section. This uniquified section is then used to replace the child's section.

Figure 5C:
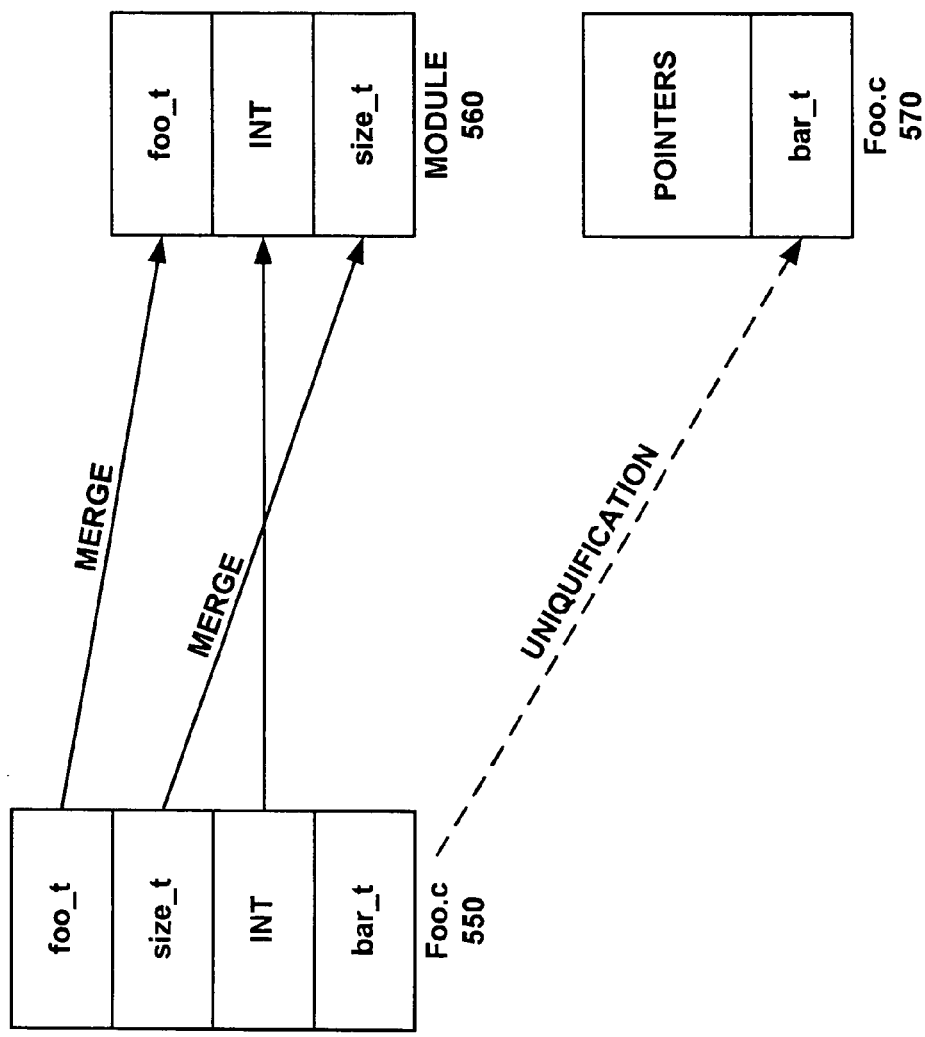
FIG. 5C is a block diagram of one embodiment of compact type format data uniquification logic of one embodiment of the present invention

FIG. 5C illustrates an exemplary unification process in which child section 550 is uniquified against parent module 560, with uniquified section 570 created as a result. Uniquified section 570 then replaces child section 550 in the child. In FIG. 5C, all types in the child section 550 are present in the parent section 560, with the exception of "bar_t". This child-unique type is thus copied to uniquified section 570. The three common types—"foo_t", "size_t" and "int"—are replaced in uniquified section 570 by links to the parent 560.

In one embodiment of the present invention, an additive merge may be performed by the merge logic 330 to build a "layer cake" necessary for a patch process. For example, assume we have two modules A and B. B is unique against A. If a patch is added to B independent of A, everything is fine —B is rebuilt, the CTF data 400 regenerated and the inter-module CTF type ID links are consistent. If, however, a patch of A is made without patching B, the type section in A will be regenerated and the IDs of the types in A will change.

References from B to A will thus be broken. To keep this from happening, an embodiment of the present invention provides a mechanism to ensure that the types in A that were present when A was released (when B was rebuilt) stay in position and keep their indices while still allowing new types to be added. This is done by adding a new layer of types with a new label. This layer includes the types that are new and/or have changed since the previous release of A. For example, if we have a pre-existing module with types labeled V1 and we wanted to add a layer for V2, this layer will consist of the new and changed types since the creation of V1. First we create an "A" module using the same mechanism used to create A—we merge all of the sections from the subordinate objects together into A. We then uniquify A against A, essentially uniquifying the module against itself. Types that are unique to A are then added to A as the V2 layer.

Library Access

Figure 6:
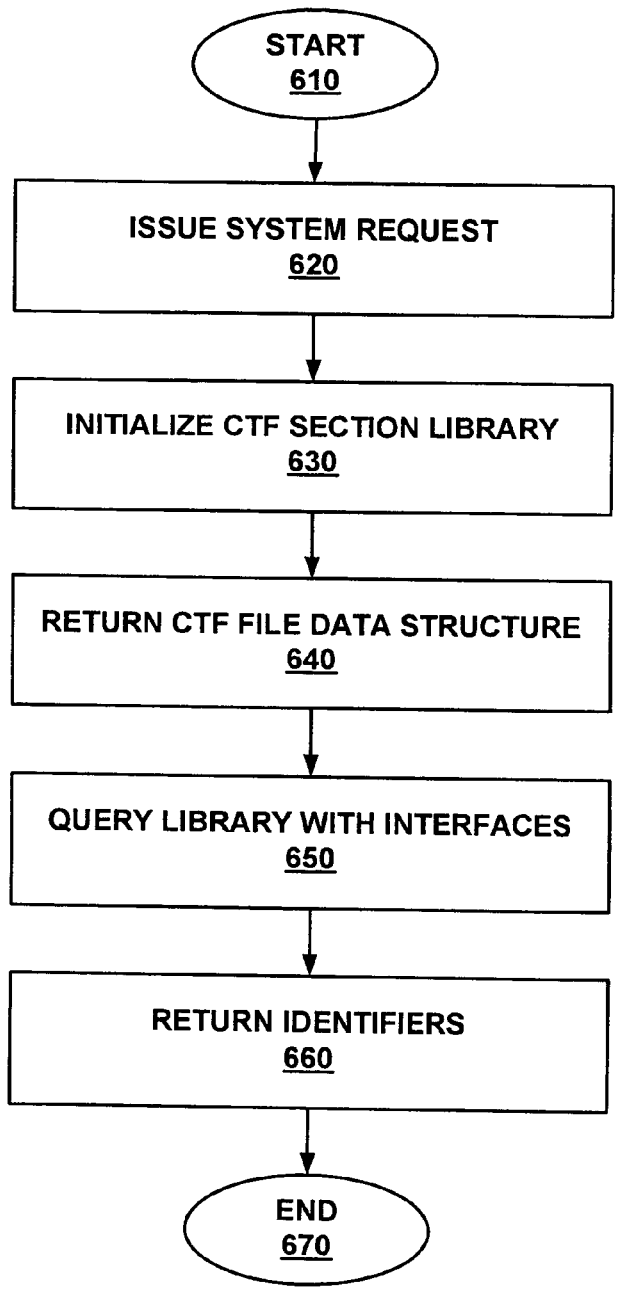
FIG. 6 is a flow diagram of one embodiment of a system data flow of an application program that uses the library APIs to access CTF data.

FIG. 6 is a block diagram of one embodiment of a system data flow 600 of an application program that uses the library APIs to access CTF data 400. As shown in FIG. 6, an application program (consumer) issues at step 620 a call to a library API to initialize the CTF data 400. In one embodiment of the present invention, three initialization methods are provided. These methods include ctf_bufopen( ), which retrieves CTD data from a raw consumer-provided buffer, ctf_fdopen( ) and ctf_open( ) which provide two means for retrieving CTF data from a file. In one embodiment of the present invention, the library interface 251 includes a common set of APIs that allow programs to access and manipulate the CTF data 400 while allowing those same programs to avoid having to depend on the specifics of a particular version of the encoding. This allows the encoding to change without mandating changes to consumer programs.

At step 630, the library 251 returns a data structure referred to as "ctf_file_t" which represents the CTF data being accessed. At step 640, the requesting application program queries the CTF library 251 using one or more interfaces. In one embodiment of the present invention, the application program may use an interface called "ctf_lookup_by_name( )" to allow the program to use the name of a given data type to retrieve the CTF description for the type.

In one embodiment of the present invention, an application may also use an interface called "lookup_by_symbol( )" to access the CTF library 251 to allow the application program to retrieve the CTF description for a given data type by giving the symbol table index of a data object of that type. In one embodiment of the present invention, the application programs may also use an iteration interface to allow the application program to iteratively process and analyze every type encoded within the CTF data 400 associated with a given ctf_file_t.

In one embodiment of the present invention, the application program may use a label iteration interface that allows the application programs to iteratively process and analyze every type covered by a given label in a specific CTF section.

The query interfaces described above return an opaque data structure which identifies the type located by the interface. This opaque identifier may be passed to one of a further set of interfaces which return specific information about the data type that corresponds to the identifier. In one embodiment of the present invention, the opaque identifier is referred to as "ctf_id_t".

At step 660, when the application program has completed querying the CTF data 400, it informs the library 251 that it has completed processing of the set of CTF data opened at step 630.

FIG. 7 is a block diagram illustration of one embodiment of an exemplary ctf_file_t data structure 700 of one embodiment of the present invention. The ctf_file_t 700 comprises pointers 710, hash tables 720, lookup arrays 730, translation tables 740 data model information 750 and link information 760.

Pointers 710 point to various ELF sections that are needed for the processing of CTF data 400. The hash tables 720 accelerates by name lookups of C programming language structures, unions and enumeration. In one embodiment of the present invention, each hash table 720 includes only the corresponding set of types. For example, the "struct" hash contains only type that correspond to C programming language structures. A fourth hash table is provided for types that are neither C programming language structures, unions, nor enumerations.

The lookup array 730 is an array of four elements. Each element includes a name "struct", "enum", "union", or none. In one embodiment of the present invention, if a multi-word by-name type lookup is requested, the CTF library 251 merely needs to iterate over the lookup elements searching for one whose name matches the first word in the requested type name. If the name matches, then a targeted search can be performed in the associated hash.

The translation information 740 includes a plurality of tables that are associated with the CTF data 400 access interfaces. In one embodiment of the present invention, the translation information 740 includes an interface called "ctf_lookup_by_symbol ( )" which is used to return type information associated with a data object located at a specific location in the symbol table. To perform this mapping between symbol table index and type, the index needs to be translated into a location in the data object section of the CTF data 400. The translation information 740 provides this mapping.

In one embodiment of the present invention, the translation information 740 includes type translation tables that are used to determine the offset of a specific type in the data type section of the CTF data 400 using the type ID. The type translation table 740 comprises an array of offsets that are indexed by the type ID.

In one embodiment of the present invention, the translation information 740 comprises a pointer translation table that is used to accelerate lookups of pointers to types. For example, say the user requested a lookup of "struct * foo", also referred to as a pointer to struct foo, the library 251 would iterate through the lookup array 730 until it found the hash that corresponded to the word "struct". It would then locate the foo type in that hash. The pointer translation table 740 allows it to locate the pointer type that references the struct foo type. The pointer translation table 740 consists of an array with one element per type indexed by type ID. The value of a given element, if non-zero, is the ID of a pointer to the type that corresponds to the element. If a struct foo type has ID 3, the value at array index 3 would be the ID of a pointer type that referenced to a struct foo.

The data model information 750 is used by the library to enable the data model and the CTF data to be implemented in different operating environments. In one embodiment of the present invention, the module may operate in a 64-bit environment while the library may be used in a 32-bit environment to access the CTF data stored in the module. When a given CTF section is opened, the library determines the data model associated with the CTF data, and records information about that data model including the size of the fundamental types in the ctf_file_t.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer system comprising:
   a processor;
   a memory storage unit;
   a plurality of user applications
   an operating system comprising a kernel, said kernel comprising a plurality of kernel modules;
   a programming compiler for compiling a programming source code into object file with stabs data; and
   a data encoding and compression system for encoding and compressing programming language data structure and data type information for use in said kernel and said plurality of user applications, the compression system including logic for converting said stabs data into compact type format (CTF) data, and the data encoding including linking logic for joining a plurality of said object files and merge logic for identifying and removing duplicate types of said data structure and said data type from said plurality of joined object files.

2. The computer system of claim 1, wherein said merge logic further identifies and removes said data structure and said data types in child modules in said kernel common to a given one of a plurality of parent modules in said kernel and said child module.

3. The computer system of claim 2, wherein said merging logic further additively merges said data structure and said data type information present in said child module but not present in said parent module to said parent module.

4. The computer system of claim 3, wherein a new label is created to identify said data structure and said data type information created by said merge logic.

5. A computer system comprising:
   a processor;
   a memory storage unit;
   a plurality of user applications, and said plurality of user applications comprise compact type format (CTF) data;
   a plurality of system programs, and said plurality of system programs comprise said CTF data;
   an operating system comprising a kernel, said kernel comprising a plurality of kernel modules, and wherein said plurality of kernel modules comprise said CTF data; and
   a data encoding and compression system for encoding and compressing programming language data structure and data type information for use in said kernel and said plurality of user applications, and wherein said data encoding and compression system further comprises uniquification data for separating unique sections in sections of a child CTF data from common sections of a parent CTF data in child modules and parent modules respectively.

6. The computer system of claim 5, further comprising crash dump with said CTF data.

7. The computer system of claim 5, further comprising a library for accessing said CTF data.

8. The computer system of claim 7, wherein said library comprises interfaces for accessing said CTF data.

9. The computer system of claim 8, wherein said library further comprises interfaces for finding said data type information.

10. The computer system of claim 9, wherein said library further comprises interfaces for iterating over said data type information.

11. The computer system of claim 10, further comprising a plurality of applications that use said library.

12. The computer system of claim 5, wherein said CTF data comprises header information used for identifying said CTF data and providing a variety of information about said CTF data.

13. The computer system of claim 12, wherein said variety of information provided by said header information comprises compression presence information for defining the presence of compression information in said CTF data.

14. The computer system of claim 13, wherein said variety of information further comprises version information defining version types in said CTF data.

15. The computer system of claim 14, wherein said variety of information further comprises type labels comprising a plurality of labels for identifying sets of data types in said sections of said CTF data.

16. The computer system of claim 15, wherein said CTF data further comprises data objects sections for storing descriptions of global and static data objects in said CTF data.

17. The computer system of claim 16, wherein said CTF data further comprises function section for storing descriptions of functions defined in given modules of said plurality of sections in said CTF data.

18. The computer system of claim 17, wherein said CTF data further comprises data types sections arranged as an array of type descriptors, each of said array of type descriptors describing individual types in said CTF data.

19. The computer system of claim 18, wherein said array of type descriptors include reference types defining other types of information in said array of type descriptors.

20. The computer system of claim 19, wherein said array of type descriptors further comprise information for type information stored in said array of descriptors.

21. The computer system of claim 20, wherein said array of type descriptors further comprise kind-specific data for specific defining specific types of data in said CTF data.

22. A computer system as recited in claim 5, wherein a compressed version of said CTF data comprises merged data structure and data type information in said CTF data, thus with no duplication.

23. A computer storage medium having a computer operating system to be executed on processor, comprising:
   a memory storage unit;
   a kernel, said kernel comprising a plurality of kernel modules; and
   a data encoding and compression system for encoding and compressing programming language data structure and data type information for use in said kernel and in a plurality of user applications;
   wherein said plurality of kernel modules and user applications comprise compact type format (CTF) data and said data encoding and compression system further comprises uniquification data for separating unique sections in sections of a child CTF data from common sections of a parent CTF data in child modules and parent modules respectively.

24. The computer storage medium of claim 23, further comprising crash dump with said CTF data.

25. The computer storage medium of claim 23, further comprising a library for accessing said CTP data.

26. The computer storage medium of claim 25, wherein said library comprises interfaces for accessing said CTP data.

27. The computer storage medium of claim 26, wherein said library further comprises interfaces for finding said data type information.

28. The computer storage medium of claim 27, wherein said library further comprises interfaces for iterating over said data type information.

29. The computer storage medium of claim 28, further comprising a plurality of applications that use said library.

30. The computer storage medium of claim 23, wherein said CTP data comprises header information used for identifying said CTF data and providing a variety of information about said CTP data.

31. The computer storage medium of claim 30, wherein said variety of information provided by said header information comprises compression presence information for defining the presence of compression information in said CTF data.

32. The computer storage medium of claim 31, wherein said variety of information further comprises version information defining version types in said CTF data.

33. The computer storage medium of claim 32, wherein said variety of information further comprises type labels comprising a plurality of labels for identifying sets of data types in said sections of said CTF data.

34. The computer storage medium of claim 33, wherein said CTF data further comprises data objects sections for storing descriptions of global and static data objects in said CTF data.

35. The computer storage medium of claim 34, wherein said CTF data further comprises function section for storing descriptions of functions defined in given modules of said plurality of sections in said CTF data.

36. The computer storage medium of claim 35, wherein said CTF data further comprises data types sections arranged as an array of type descriptors, each of said array of type descriptors describing individual types in said CTF data.

37. The computer storage medium of claim 23, wherein a compressed version of said CTF data comprises merged data structure and data type information in said CTF data, thus with no duplication.

38. A computer system having a processor for executing instructions and a storage for storing a computer
implemented data structure and data type encoding and compression system, the storage further including program instruction comprising:
instructions for compiling a source file into an object file with stabs data;
data encoding logic instructions for generating compact type format (CTF) data from said stabs data;
linking logic instructions for linking a plurality of said object file generated by said compiler;
data merge instructions for merging said for identifying and removing duplicate data structure and data type information from said plurality of linked object files to; and
data generation logic instructions for generating compressed CTF data subsequent to said merging of said data structure and said data type;
wherein said data structure and data pe encoding and compression system further comprises data uniquification logic for generating said CTF data unique to children modules with respect to a corresponding parent module.

39. The computer system of claim 38, wherein a compressed version of said CTF data comprises merged data structure and data type information in said CTF data, thus with no duplication.

40. A method of generating compressed and encoded data of a computer operating system to user level applications, said method comprising:
compiling a plurality of source files into a plurality of object files with stabs data;
converting said stabs data into a plurality of compact type format (CTF) data; and
automatically generating compressed version of said CTF data to said user level applications; and wherein said automatically generating compressed version of said CTF data comprises merging data structure and data type information in said CTF data to remove duplicate information.

* * * * *